(12) United States Patent
Sun

(10) Patent No.: US 8,254,101 B2
(45) Date of Patent: Aug. 28, 2012

(54) DESKTOP COMPUTER WITH MONITOR MOUNT

(75) Inventor: Zheng-Heng Sun, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 213 days.

(21) Appl. No.: 12/852,596

(22) Filed: Aug. 9, 2010

(65) Prior Publication Data

US 2011/0292582 A1  Dec. 1, 2011

(30) Foreign Application Priority Data

May 27, 2010 (CN) .......................... 2010 1 0184862

(51) Int. Cl.
*H05K 7/00* (2006.01)
*A47B 97/00* (2006.01)
*G02F 1/1333* (2006.01)

(52) U.S. Cl. .............. 361/679.22; 248/220.31; 248/918; 312/223.2; 349/58

(58) Field of Classification Search ............. 361/679.21, 361/679.22, 679.29; 312/223.1–223.3; 248/917–918; 349/58
See application file for complete search history.

(56) References Cited

U.S. PATENT DOCUMENTS

| | | | |
|---|---|---|---|
| 6,108,195 A * | 8/2000 | Behl et al. ................. | 361/679.23 |
| 6,157,423 A * | 12/2000 | Stonebraker et al. ........... | 349/58 |
| 6,366,453 B1 * | 4/2002 | Wang et al. ............... | 361/679.06 |
| 6,418,010 B1 * | 7/2002 | Sawyer ..................... | 361/679.05 |
| 6,522,530 B2 * | 2/2003 | Bang ....................... | 361/679.06 |
| 6,909,598 B2 * | 6/2005 | Cheng et al. ............. | 361/679.22 |
| 7,377,603 B2 * | 5/2008 | Quijano ........................ | 312/245 |
| 7,505,254 B2 * | 3/2009 | Sheng et al. ............. | 361/679.27 |
| 8,164,888 B2 * | 4/2012 | Ma et al. .................. | 361/679.21 |

* cited by examiner

Primary Examiner — Zachary M Pape
(74) Attorney, Agent, or Firm — Altis Law Group, Inc.

(57) ABSTRACT

A desktop computer includes a monitor defining a number of screw holes in the backside and a chassis defining a number of fixing holes. A number of screws extending through the fixing holes of the chassis and mounts into the corresponding screw holes of the monitor, to mount the monitor to the chassis.

5 Claims, 4 Drawing Sheets

DESKTOP COMPUTER WITH MONITOR MOUNT

BACKGROUND

1. Technical Field

The present disclosure relates to desktop computers and specifically to a desktop computer with a mountable monitor feature.

2. Description of Related Art

It is well known that the chassis and monitor of a desktop computer are generally not arranged together. In use, the chassis and the monitor should be connected by data wires. As a result, the desktop computer will take more space, furthermore, the top of the desk, especially the area behind and leading to and from the desktop computer and monitor, may be cluttered with wires.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
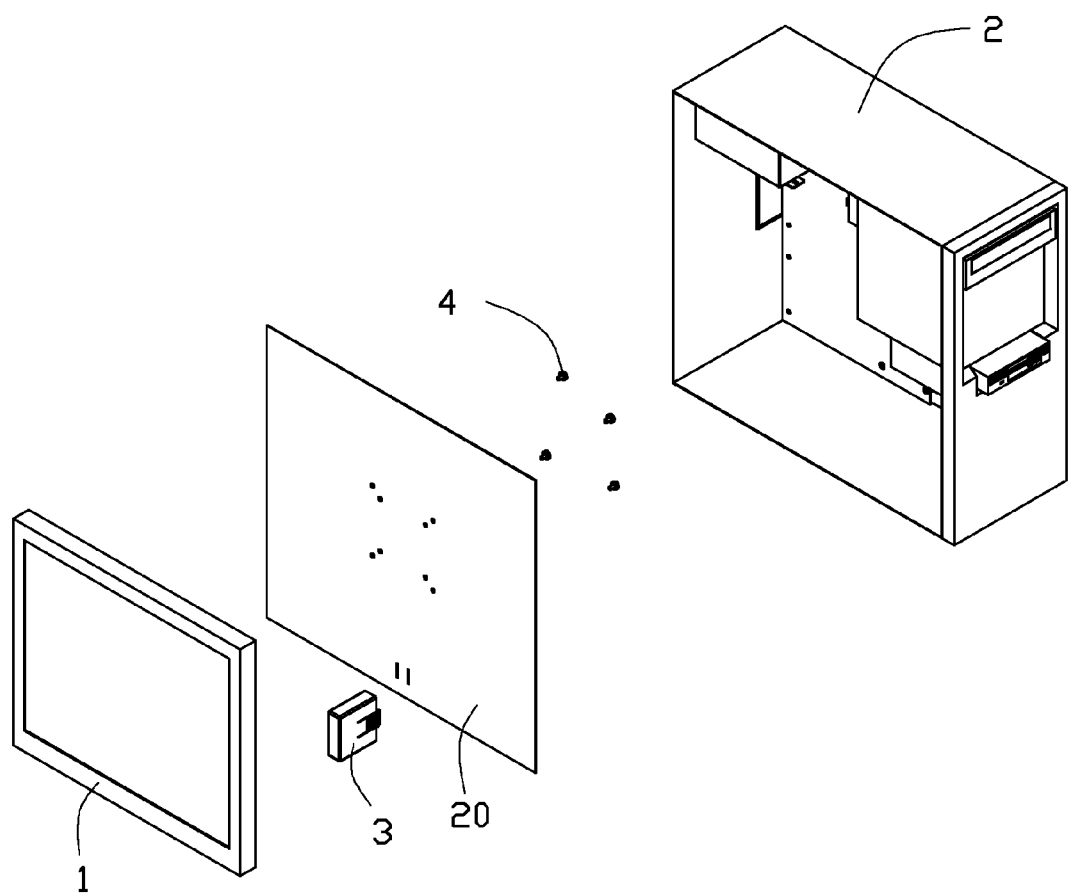
FIG. 1 is an exploded, isometric view of an exemplary embodiment of a desktop computer.
Figure 2:
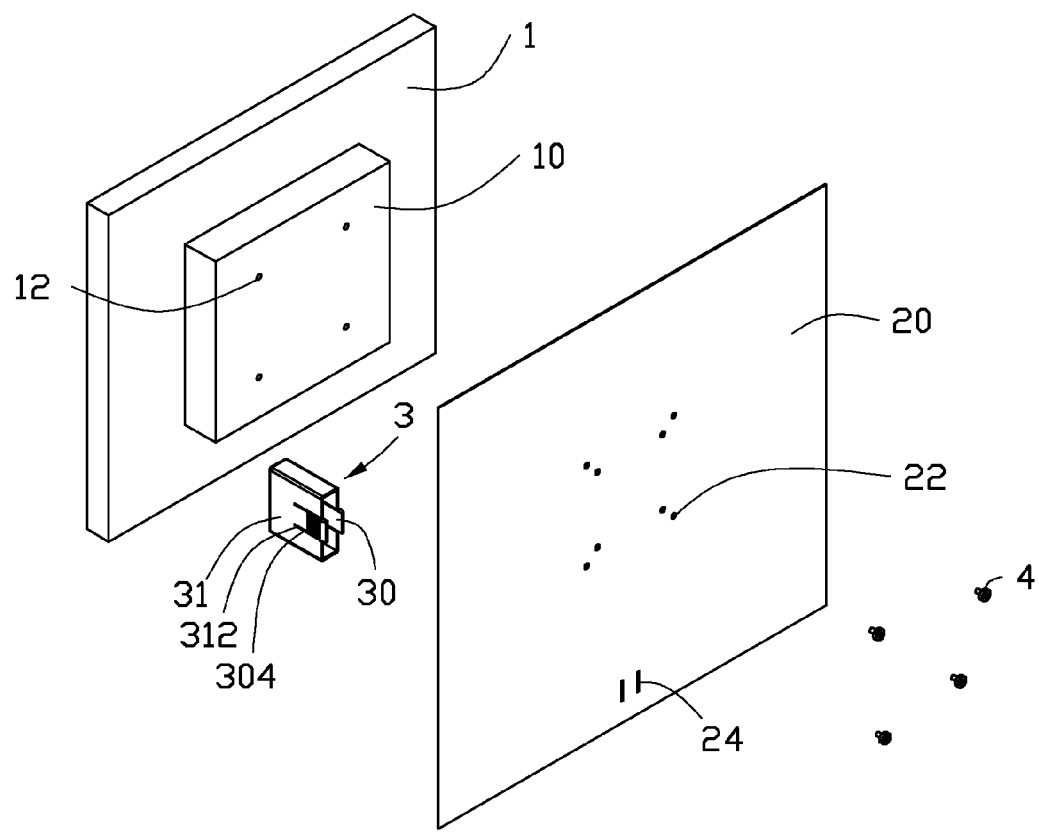
FIG. 2 is a partial, exploded, isometric view of the desktop computer, but viewed from another perspective.

Referring to FIG. 1 and FIG. 2, an exemplary embodiment of a desktop computer includes a monitor 1, a chassis 2, and a supporting member 3. The chassis 2 includes a sidewall 20.

A protrusion 10 protrudes from a backside of the monitor 1, and four screw holes 12 are defined in four corners of the protrusion 10.

A plurality of fixing holes 22 corresponding to each screw hole 12 is defined in a center of the sidewall 20 of the chassis 2. Two parallel slots 24 are defined in a side of the sidewall 20 of the chassis 2.

The supporting member 3 includes two opposite sidewalls 31. Two parallel splits 312 extend from a side to a center of each sidewall 31. A resilient latch 30 extends from each sidewall 31, located between the corresponding splits 312. An antiskid portion is formed on each latch 30.

Figure 3:
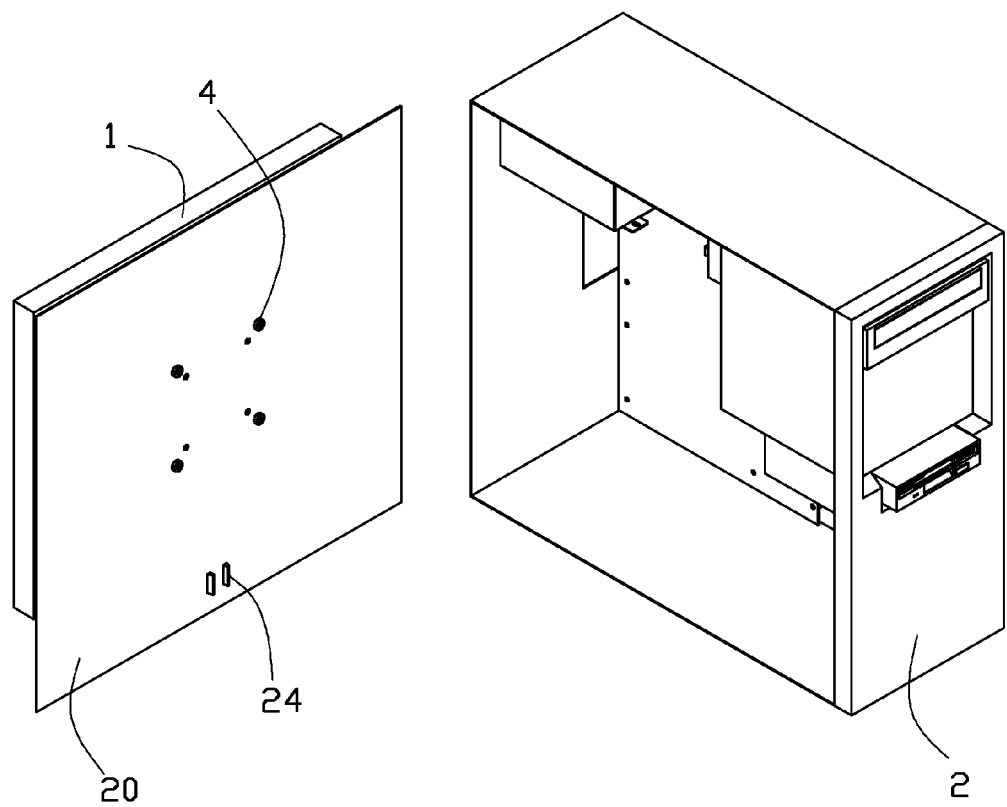
FIG. 3 is a partially assembled, isometric view of the desktop computer of FIG. 1.
Figure 4:
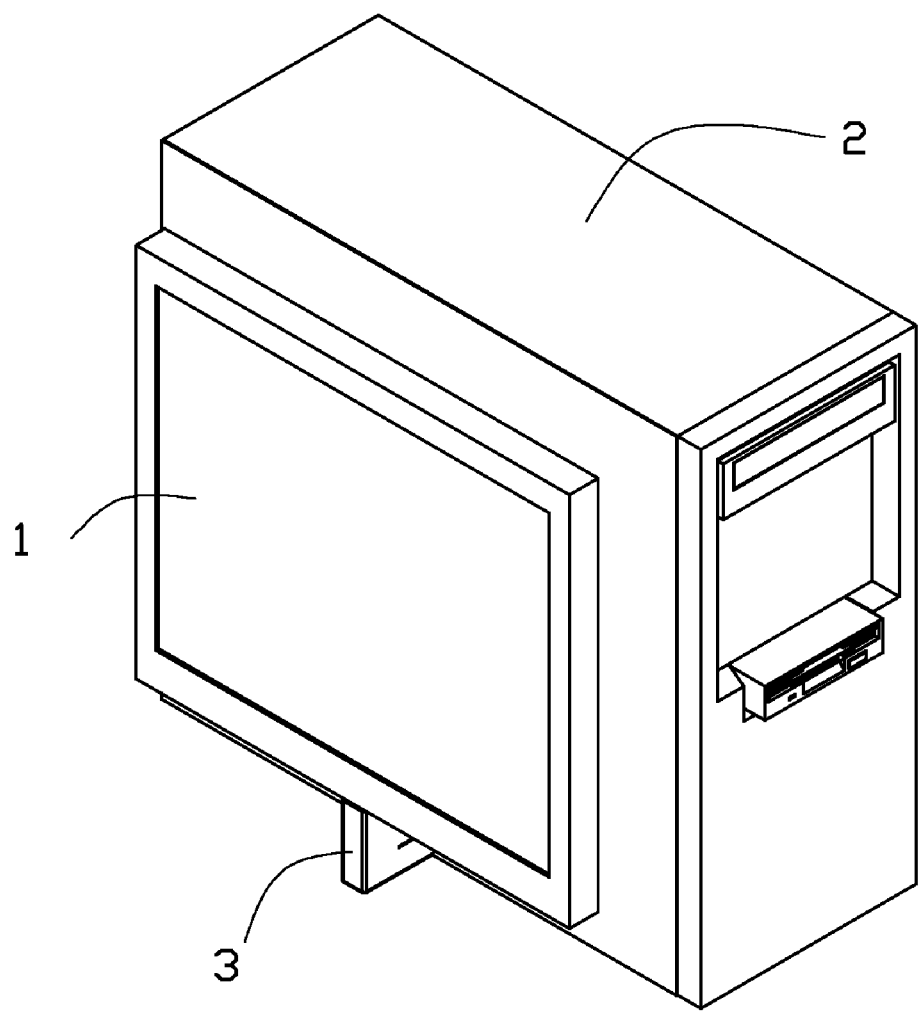
FIG. 4 is an assembled, isometric view of the desktop computer of FIG. 1.

Referring to FIG. 3 and FIG. 4, in assembly, four screws 4 extend through the corresponding fixing holes 22 of the sidewall 20 of the chassis 2, and fix into the corresponding screw holes 12 of the monitor 1, to mount the monitor 1 to the sidewall 20. The sidewall 20 is then installed to the chassis 2.

The latches of the supporting member 3 are engaged in the corresponding slots 24 of the sidewall 20, thereby the supporting member 3 may support the monitor 1 to prevent the desktop computer from tipping. The bottom of the supporting member 3 and the chassis 1 are in the same level, and the top of the supporting member 3 abuts against the bottom of the monitor 1. The antiskid portion 304 of each latch 30 is used for conveniently operating the supporting member 3.

In another embodiment, the supporting member 3 may be omitted or several pairs of slots 24 may be utilized in the sidewall 20 of the chassis 2 for installing several supporting members 3.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A desktop computer, comprising:
   a chassis comprising a sidewall, the sidewall defining a plurality of fixing holes;
   a monitor defining a plurality of screw holes in a backside, corresponding to the plurality of fixing holes; and
   at least one supporting member;
   wherein a plurality of screws extending through the fixing holes of the chassis and mounts into the corresponding screw holes of the monitor, to mount the monitor to the chassis; and
   wherein each supporting member comprises two latches; two slots are defined in the sidewall of the chassis corresponding to the latches below the monitor; the latches are engaged in the corresponding slots, and the supporting member supports the monitor.

2. The desktop computer of claim 1, wherein each supporting member comprises two opposite sidewalls each defining two splits extending from a side of each sidewall, each latch is formed between the two splits of each sidewall.

3. The desktop computer of claim 1, wherein the bottom of each supporting member and the chassis are at the same level and the top of the supporting member abuts against the bottom of the monitor.

4. The desktop computer of claim 1, wherein an antiskid portion is formed on each latch.

5. The desktop computer of claim 1, wherein a protrusion extends from the backside of the monitor, the plurality of screw holes of the monitor are defined in corresponding corners of the protrusion.

* * * * *